(12) United States Patent
Johnson et al.

(10) Patent No.: US 8,121,540 B1
(45) Date of Patent: Feb. 21, 2012

(54) REPEATER SYSTEM AND METHOD FOR PROVIDING WIRELESS COMMUNICATIONS

(75) Inventors: Harold Wayne Johnson, Roach, MO (US); Mohan R. Tammisetti, South Riding, VA (US); David L. Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 918 days.

(21) Appl. No.: 12/133,534

(22) Filed: Jun. 5, 2008

(51) Int. Cl.
*H04B 5/00* (2006.01)

(52) U.S. Cl. .......... 455/41.1; 455/22; 455/41.2; 455/20; 455/13.1

(58) Field of Classification Search .............. 455/7, 11.1, 455/13.1, 15, 41.1, 41.2, 292, 338, 22, 20; 343/715, 713, 704, 895, 711, 712, 795, 24 C, 343/700; 370/315
See application file for complete search history.

(56) References Cited

U.S. PATENT DOCUMENTS

| | | | |
|---|---|---|---|
| 4,931,806 A | | 6/1990 | Wunderlich |
| 5,181,043 A | | 1/1993 | Cooper |
| 5,451,966 A | | 9/1995 | Du et al. |
| 5,565,877 A | * | 10/1996 | Du et al. ........................ 343/715 |
| 5,600,333 A | | 2/1997 | Justice et al. |
| 5,898,408 A | | 4/1999 | Du |
| 6,172,651 B1 | | 1/2001 | Du |
| 6,191,747 B1 | | 2/2001 | Cosenza |
| 6,215,451 B1 | | 4/2001 | Hadzoglou |
| 6,232,926 B1 | | 5/2001 | Nguyen et al. |
| 6,538,609 B2 | | 3/2003 | Nguyen et al. |
| 6,661,386 B1 | * | 12/2003 | Petros et al. ................... 343/713 |
| 6,686,882 B2 | | 2/2004 | Petros et al. |
| 2002/0008667 A1 | * | 1/2002 | Nguyen et al. ................ 343/715 |
| 2002/0060646 A1 | | 5/2002 | Petros et al. |
| 2006/0025072 A1 | * | 2/2006 | Pan .............................. 455/11.1 |

* cited by examiner

*Primary Examiner* — Tan Trinh

(57) ABSTRACT

A repeater system is supplied for providing wireless communications. In an example, a repeater system is supplied to receive user information with an antenna in a wireless signal at a first frequency and transfer the user information in an electrical signal at the first frequency. A frequency converter receives the user information in the electrical signal at the first frequency and transfers the user information in the electrical signal at a second frequency. A first coupler receives the user information in the electrical signal at the second frequency and transfers the user information in a capacitive signal. A second coupler receives the user information in the capacitive signal and transfers the user information in an electrical signal at the second frequency. A second frequency converter receives the user information in the electrical signal at the second frequency and transfers the user information in the electrical signal at the first frequency. An antenna receives the user information in the electrical signal at the first frequency and transfers the user information in a wireless signal at the first frequency. Additionally, a method of providing wireless communications using the above mentioned repeater system is also provided.

16 Claims, 4 Drawing Sheets

REPEATER SYSTEM AND METHOD FOR PROVIDING WIRELESS COMMUNICATIONS

TECHNICAL BACKGROUND

One of the main inconveniences of using a wireless communication device is not being able to effectively receive or transmit a wireless communication signal. This is especially true in rural areas. One way to improve the exchange of wireless communication signals is by using a wireless repeater. A wireless repeater is a device used to boost the reception of a wireless communication device to an area.

OVERVIEW

Generally described, a repeater system is supplied for providing wireless communications. In an example, a repeater system is supplied to receive user information with an antenna in a wireless signal at a first frequency and transfer the user information in an electrical signal at the first frequency. A frequency converter receives the user information in the electrical signal at the first frequency and transfers the user information in the electrical signal at a second frequency. A first coupler receives the user information in the electrical signal at the second frequency and transfers the user information in a capacitive signal. A second coupler receives the user information in the capacitive signal and transfers the user information in an electrical signal at the second frequency. A second frequency converter receives the user information in the electrical signal at the second frequency and transfers the user information in the electrical signal at the first frequency. An antenna receives the user information in the electrical signal at the first frequency and transfers the user information in a wireless signal at the first frequency. Additionally, a method of providing wireless communications using the above mentioned repeater system is also provided.

DETAILED DESCRIPTION

Figure 1:
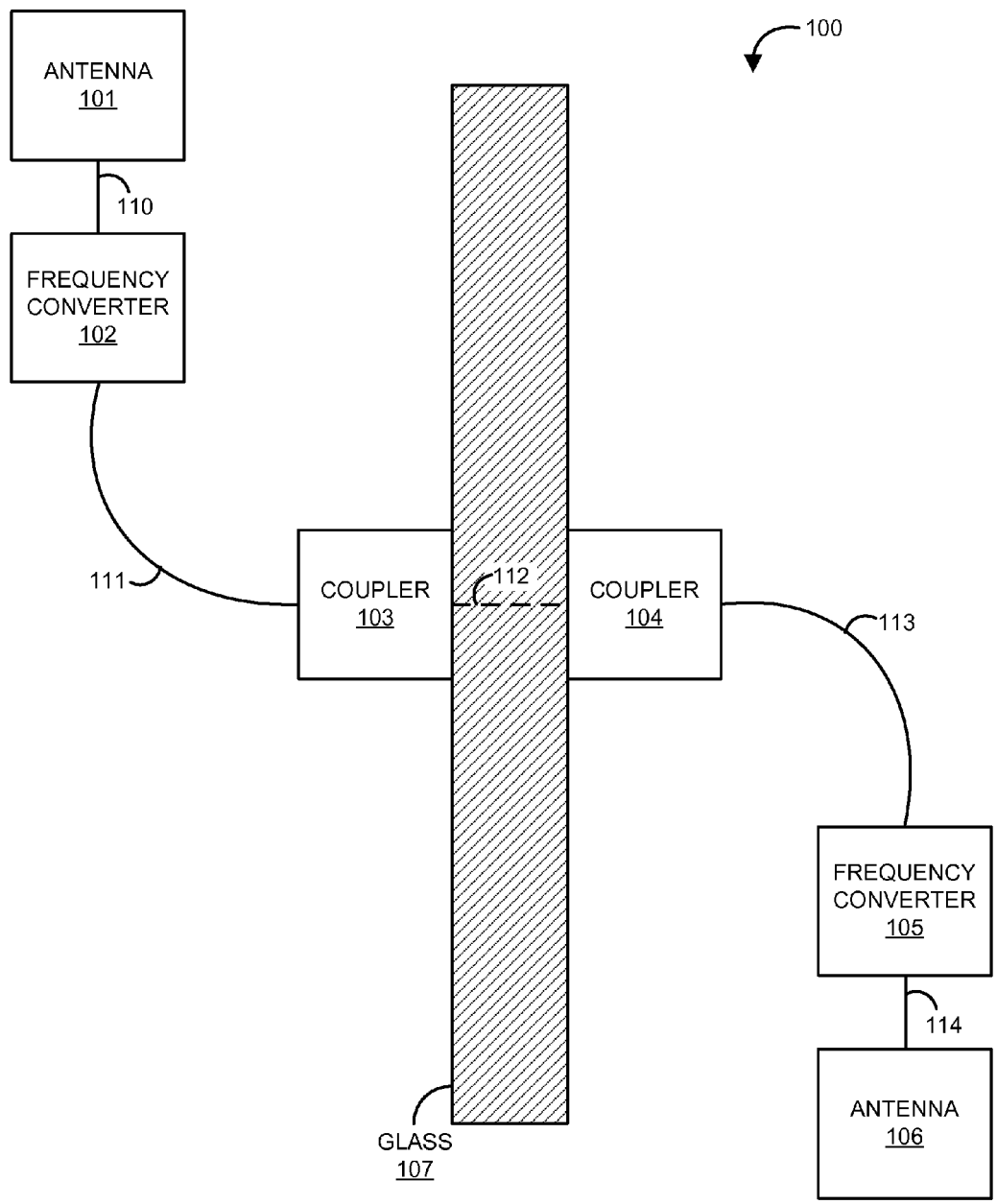
FIG. 1 is a block diagram illustrating a repeater system.

FIG. 1 illustrates repeater system 100. Repeater system 100 is configured to exchange user information between antenna 101 and antenna 106. Repeater system 100 includes antenna 101, frequency converter 102, coupler 103, coupler 104, frequency converter 105, and antenna 106. Repeater system 100 may be used in a building where glass 107 could be a part of that building. Antenna 101 and frequency converter 102 communicate over communication link 110. Frequency converter 102 and coupler 103 communicate over communication link 111. Coupler 103 and coupler 104 communicate over capacitive link 112. Coupler 104 and frequency converter 105 communicate over communication link 113. Frequency converter 105 and antenna 106 communicate over communication link 114. Thus, antenna 101 and antenna 106 communicate over the links and components described above.

Antenna 101 comprises at least one antenna element that could be a metal bar, although other materials could be used. Antenna 101 could be located indoors or outdoors. Antenna 101 exchanges user information with a wireless communication device (not shown) in wireless communication signals at a first frequency. Antenna 101 also exchanges the user information with frequency converter 102 over communication link 110 in electrical communication signals at the first frequency.

Frequency converter 102 comprises interfaces and circuitry that convert one frequency to another frequency. Frequency converter 102 also exchanges user information. Frequency converter 102 exchanges the user information with antenna 101 over communication link 110 in electrical communication signals at the first frequency. Frequency converter 102 also exchanges the user information with coupler 103 over communication link 111 in electrical communication signals at a second frequency.

Coupler 103 comprises interfaces and circuitry for capacitive coupling. Coupler 103 may also comprise interfaces and circuitry for inductive coupling. Coupler 103 may comprise a single capacitive coupler or may comprise multiple capacitive and inductive couplers. Coupler 103 exchanges user information with frequency converter 102 over communication link 111 in electrical communication signals at the second frequency. Coupler 103 also exchanges the user information with coupler 104 over capacitive link 112 through glass 107.

Coupler 104 comprises interfaces and circuitry for capacitive coupling. Coupler 104 may also comprise interfaces and circuitry for inductive coupling. Coupler 104 may comprise a single capacitive coupler or may comprise multiple capacitive and inductive couplers. Coupler 104 exchanges user information with coupler 103 over capacitive link 112 through glass 107. Coupler 104 also exchanges the user information with frequency converter 105 over communication link 113 in electrical communication signals at the second frequency.

Frequency converter 105 comprises interfaces and circuitry that convert one frequency to another frequency. Frequency converter 105 also exchanges user information. Frequency converter 105 exchanges the user information with coupler 104 over communication link 113 in electrical communication signals at the second frequency. Frequency converter 105 also exchanges the user information with antenna 106 over communication link 114 in electrical communication signals at the first frequency.

Antenna 106 comprises at least one antenna element that could be a metal bar, although other materials could be used. Antenna 106 could be located indoors or outdoors. Antenna 106 exchanges user information with frequency converter 105 over communication link 114 in electrical communication signals at the first frequency. Antenna 106 also exchanges the user information with a wireless communication device (not shown) in wireless communication signals at the first frequency.

Communication links 110, 111, 113, and 114 comprise wired communication links. The wired links typically have insulating jackets. For example, link 111 may comprise one wire for a transmit signal, one wire for a receive signal, and one wire for power where all the individual wires are insulated from the external environment and from each other. Capacitive link 112 comprises a wireless communication link.

Figure 2:
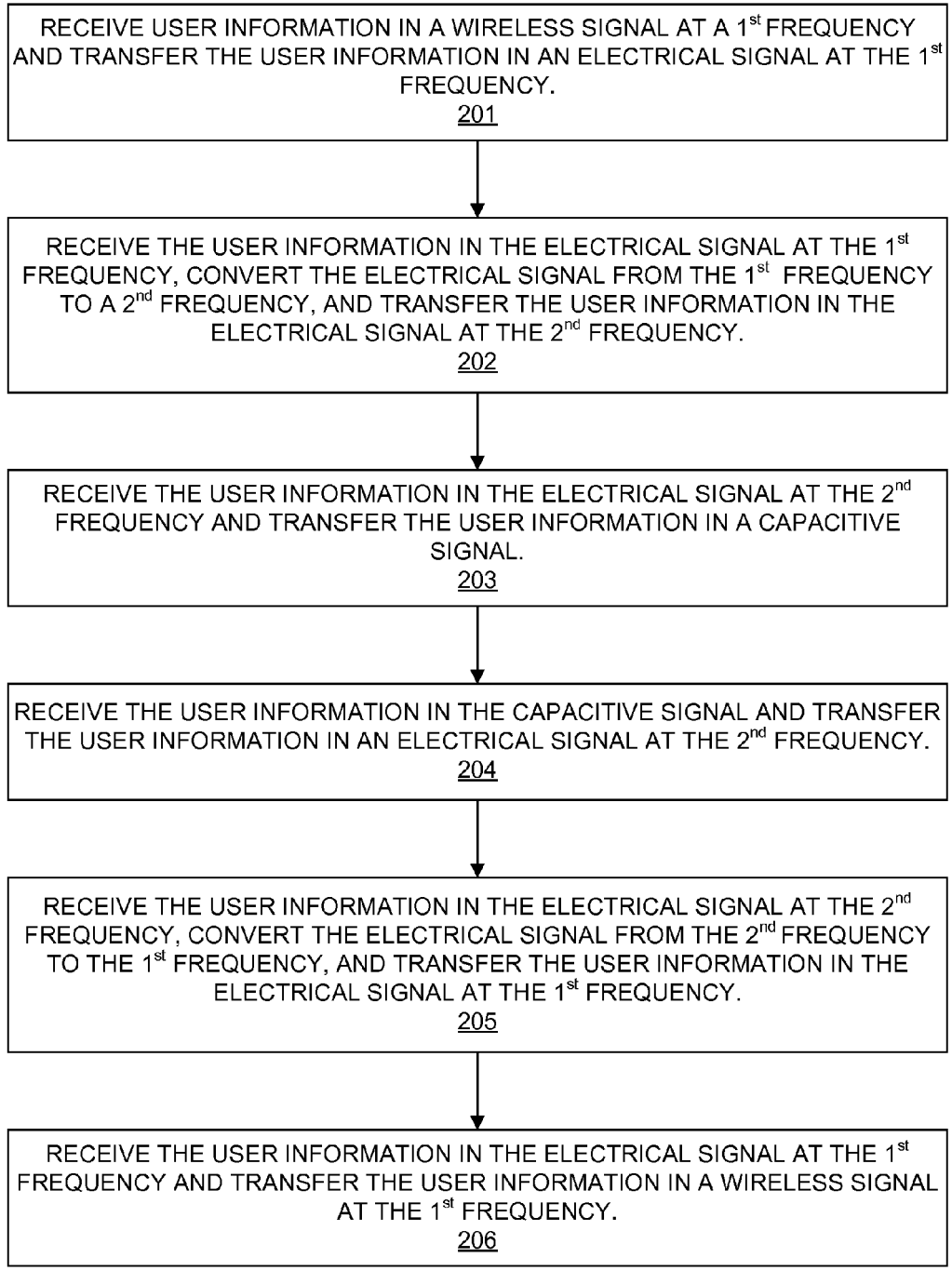
FIG. 2 is a flow diagram that illustrates the operation of a repeater system.

FIG. 2 illustrates an example of a process for providing wireless communications employed by repeater system 100. In step 201, antenna 101 receives user information from a wireless device (not shown) in a wireless signal at a first frequency. The user information may include a phone call, an email, a text message, streaming video, or various other types and combinations of user information. Also in step 201, antenna 101 transfers the user information to frequency converter 102 over communication link 110 in an electrical signal at the first frequency.

In step 202, frequency converter 102 receives the user information from antenna 101 over communication link 110 in the electrical signal at the first frequency. Frequency converter 102 converts the electrical signal from the first frequency to a second frequency. The first frequency is in the RF range and the second frequency may be in an intermediate range that is lower than the first frequency. When the second frequency is in a low enough range from the first frequency, the second frequency will not significantly interfere with the first frequency. Also in step 202, frequency converter 102 transfers the user information to coupler 103 over communication link 111 in the electrical signal at the second frequency.

In step 203, coupler 103 receives the user information from frequency converter 102 over communication link 111 in the electrical signal at the second frequency. Also in step 203, coupler 103 transfers the user information to coupler 104 over capacitive link 112 in a capacitive signal through glass 107.

In step 204, coupler 104 receives the user information from coupler 103 over capacitive link 112 in the capacitive signal through glass 107. Also in step 204, coupler 104 transfers the user information to frequency converter 105 over communication link 113 in an electrical signal at the second frequency.

In step 205, frequency converter 105 receives the user information from coupler 104 over communication link 113 in the electrical signal at the second frequency. Frequency converter 105 converts the electrical signal from the second frequency to the first frequency. Also in step 205, frequency converter 105 transfers the user information to antenna 106 over communication link 114 in the electrical signal at the first frequency.

In step 206, antenna 106 receives the user information from frequency converter 105 over communication link 114 in the electrical signal at the first frequency. Also in step 206, antenna 106 transfers the user information to a wireless communication system or a wireless communication device in a wireless signal at the first frequency.

Figure 3:
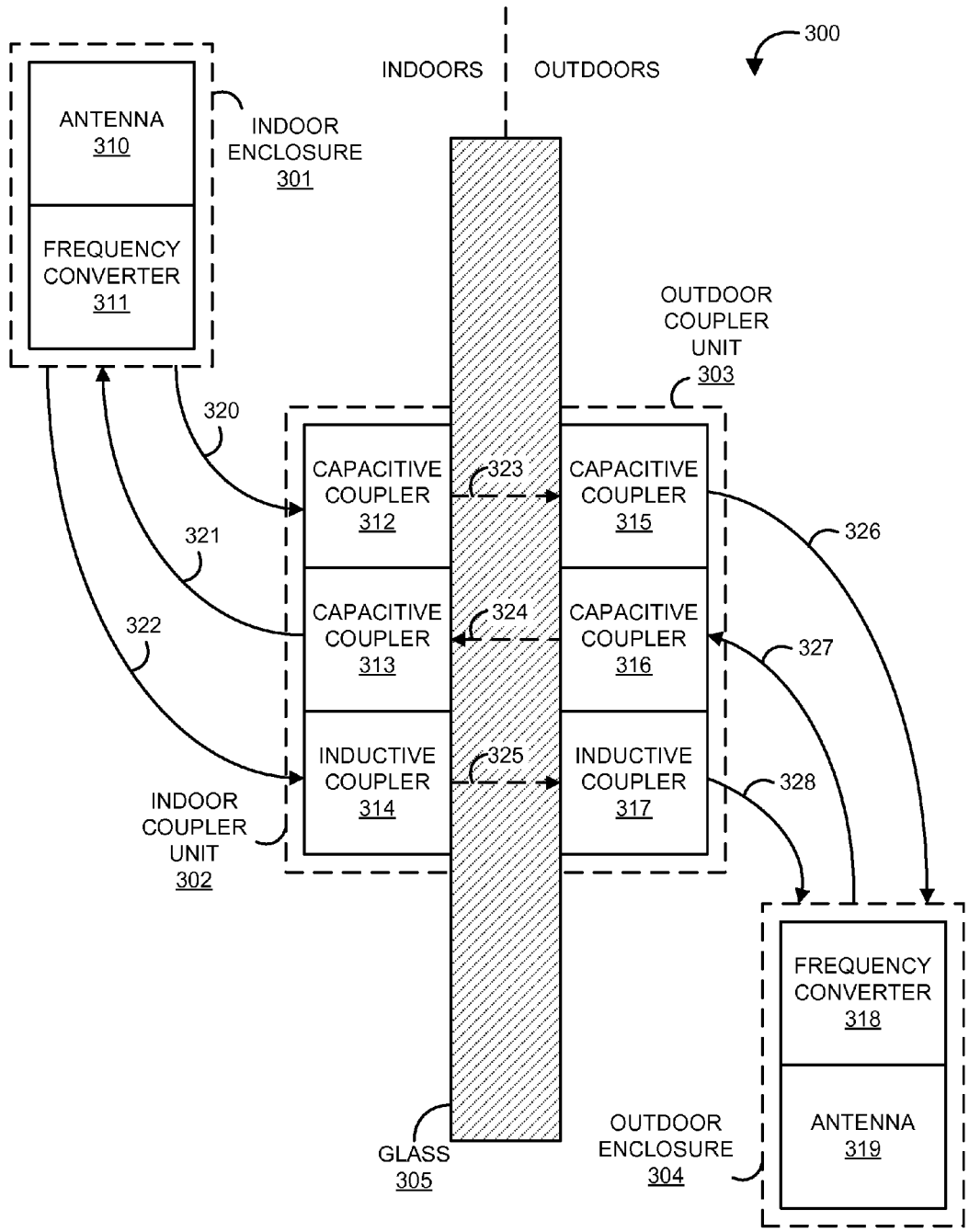
FIG. 3 is a block diagram illustrating a repeater system.

FIG. 3 illustrates repeater system 300. Repeater system 300 is configured to exchange user communications between indoor enclosure 301 and outdoor enclosure 304. Repeater system 300 is bi-directional. For example, when a mobile phone call is placed from indoors the user information that is associated with that mobile phone call is transferred from indoor enclosure 301 to capacitive coupler 312 over communication link 320. The user information is then transferred from capacitive coupler 312 to capacitive coupler 315 over capacitive link 323. Capacitive coupler 315 then transfers the user information to outdoor enclosure 304 over communication link 326. In another example, when a mobile phone call is received by outdoor enclosure 304, the user information that is associated with that mobile phone call is transferred to capacitive coupler 316 over communication link 327. The user information is then transferred from capacitive coupler 316 to capacitive coupler 313 over capacitive link 324. Capacitive coupler 313 then transfers the user information to indoor enclosure 301 over communication link 321.

Repeater system 300 includes indoor enclosure 301, indoor coupler unit 302, outdoor coupler unit 303, and outdoor enclosure 304. Repeater system 300 may be used in a building where glass 305 could be an external window of that building. Indoor enclosure 301 comprises antenna 310 and frequency converter 311. Indoor coupler unit 302 comprises capacitive coupler 312, capacitive coupler 313, and inductive coupler 314. Outdoor coupler unit 303 comprises capacitive coupler 315, capacitive coupler 316, and inductive coupler 317. Outdoor enclosure 304 comprises frequency converter 318 and antenna 319. Indoor enclosure 301, indoor coupler unit 302, outdoor coupler unit 303, and outdoor enclosure 304 could be made from plastic or some other suitable material.

Indoor enclosure 301 and indoor coupler unit 302 communicate over communication links 320 and 321. Additionally, indoor enclosure 301 transfers power to indoor coupler unit 302 over power link 322. Indoor coupler unit 302 and outdoor coupler unit 303 communicate over links 323 and 324, wherein capacitive coupler 312 communicates with capacitive coupler 315 over capacitive link 323 and capacitive coupler 313 communicates with capacitive coupler 316 over capacitive link 324. Additionally, indoor coupler unit 302 transfers power to outdoor coupler unit 303, wherein inductive coupler 314 transfers power to inductive coupler 317 over inductive power link 325. Outdoor coupler unit 303 and outdoor enclosure 304 communicate over communication links 326 and 327. Additionally, outdoor coupler unit 303 transfers power to outdoor enclosure 304 over power link 328. Thus, indoor enclosure 301 and outdoor enclosure 304 communicate and transfer power over the links and components described above.

Indoor enclosure 301 comprises antenna 310 and frequency converter 311. Antenna 310 and frequency converter 311 are connected by electrical circuitry. Antenna 310 exchanges the user information with a wireless communication device (not shown) in wireless communication signals at a first frequency. Antenna 310 also exchanges the user information with frequency converter 311 in electrical communication signals at the first frequency. Additionally, Indoor enclosure 301 has a power supply (not shown). The power supply may be a power cord, a battery, or some other type of power supply. The power supply provides power to antenna 310, frequency converter 311, and power link 322.

Frequency converter 311 exchanges the user information with antenna 310 in electrical communication signals at the first frequency. Frequency converter 311 also exchanges the user information with capacitive couplers 312 and 313 over communication links 320 and 321, respectively, in electrical communication signals at a second frequency. Frequency converter 311 may also amplify the electrical communication signals.

Indoor coupler unit 302 comprises interfaces and circuitry for inductive and capacitive coupling. Indoor coupler unit 302 is attached to glass 305 by an adhesive material. The adhesive material may comprise glue, tape, or some other form of adhesive suitable for attachment to glass. Indoor coupler unit 302 comprises capacitive coupler 312, capacitive coupler 313, and inductive coupler 314. Capacitive couplers 312 and 313 exchange the user information with frequency converter 311 over links 320 and 321, respectively, in electrical communication signals at the second frequency. Capacitive coupler 312 exchanges the user information with capacitive coupler 315 over capacitive link 323 in a capacitive signal through glass 305. Capacitive coupler 313 exchanges the user information with capacitive coupler 316 over capacitive link 324 in a capacitive signal through glass 305. Inductive coupler 314 receives an AC power signal from enclosure 301 over power link 322. Inductive coupler 314 also transfers the AC power signal to inductive coupler 317 over inductive link 325 through glass 305.

Outdoor coupler unit 303 comprises interfaces and circuitry for inductive and capacitive coupling. Outdoor coupler unit 303 is attached to glass 305 by an adhesive material. The adhesive material may comprise glue, tape, or some other form of adhesive suitable for attachment to glass. Outdoor coupler unit 303 comprises capacitive coupler 315, capacitive coupler 316, and inductive coupler 317. Capacitive coupler 315 exchanges the user information with capacitive coupler 312 over capacitive link 323 through glass 305. Capacitive coupler 315 also exchanges the user information with frequency converter 318 over communication link 326 in an electrical communication signal at the second frequency. Capacitive coupler 316 exchanges the user information with capacitive coupler 313 over capacitive link 324 through glass 305. Capacitive coupler 316 also exchanges the user information with frequency converter 318 over communication link 327 in an electrical communication signal at the second frequency. Inductive coupler 317 receives an AC power signal from inductive coupler 314 over inductive link 325 through glass 305. Inductive coupler 317 also transfers the AC power signal to a power supply (not shown) in outdoor enclosure 304 over power link 328.

Outdoor enclosure 304 comprises frequency converter 318 and antenna 319. Outdoor enclosure 304 also comprises a power supply (now shown). The power supply provides power to frequency converter 318 and antenna 319. Frequency converter 318 exchanges user information with capacitive couplers 315 and 316 over communication links 326 and 327, respectively, in electrical communication signals at the second frequency. Frequency converter 318 exchanges the user information with antenna 319 in electrical communication signals at the first frequency. Frequency converter 318 may also amplify the electrical communication signals.

Antenna 319 and frequency converter 318 are connected by electrical circuitry. Antenna 319 exchanges the user information with frequency converter 318 in electrical communication signals at the first frequency. Antenna 319 also exchanges the user information with a wireless communication system (not shown) in wireless communication signals at the first frequency.

Communication links 320-322 and 326-328 comprise wired communication links. Communication links 320-322 are depicted as separate signal paths but may be integrated into a single cable. Communication links 326-328 are also depicted as separate signal paths but may also be integrated into a single cable. Communication links 323 and 324 comprise capacitive links. Power link 325 comprises an inductive link.

Figure 4:
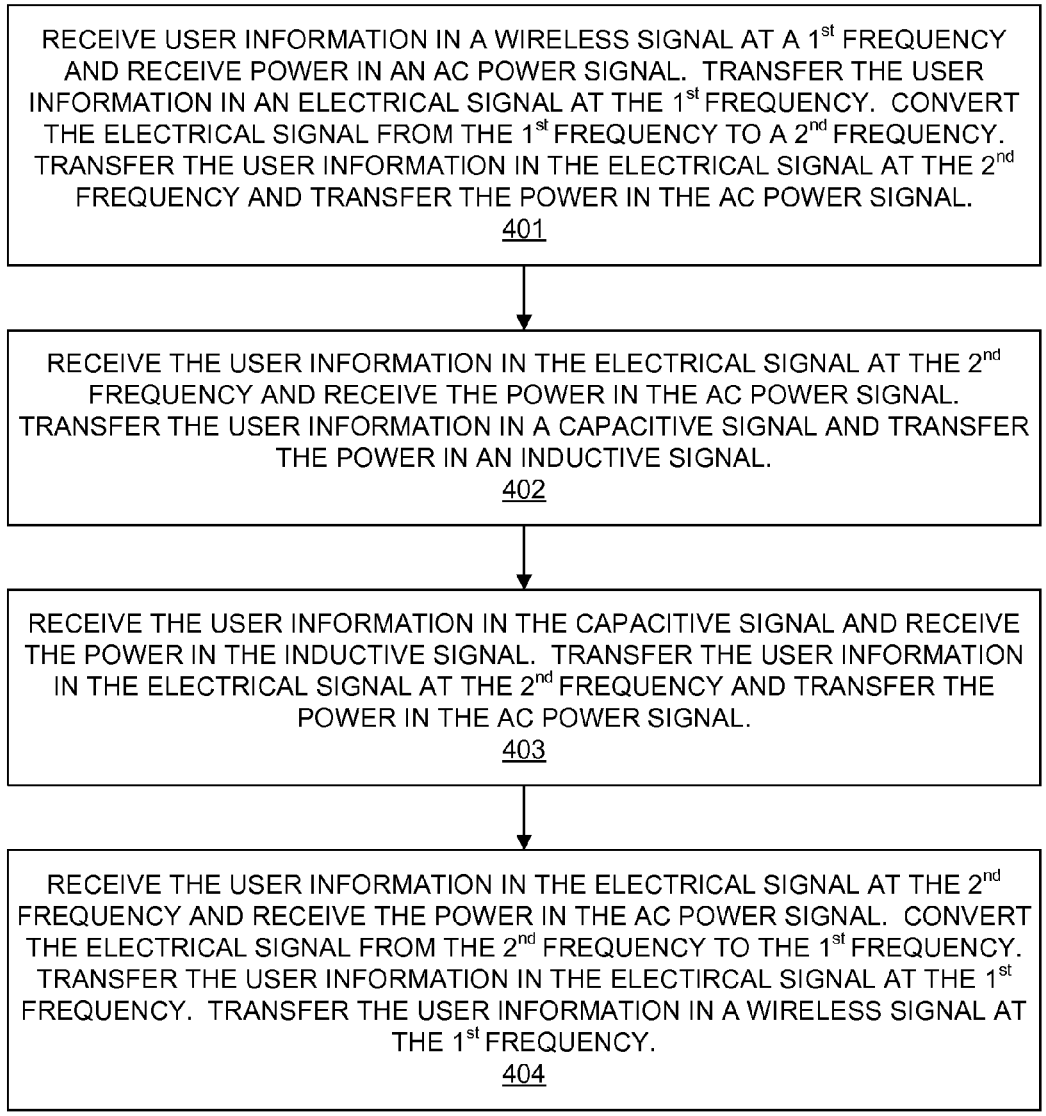
FIG. 4 is a flow diagram that illustrates the operation of a repeater system.

FIG. 4 illustrates an example of a process for providing wireless communications employed by repeater system 300. In step 401, indoor enclosure 301 receives a mobile phone call, which originated indoors, from a mobile phone in a wireless signal at a first frequency. Indoor enclosure 301 also receives power through a connected power cord (not shown). Antenna 310 and frequency converter 311 exchange the mobile phone call in an electrical signal at the first frequency. Frequency converter 311 converts the electrical signal from the first frequency to a second frequency. Also in step 401, indoor enclosure 301 transfers the mobile phone call to capacitive coupler 312, located in indoor coupler unit 302, over communication link 320 in the electrical signal at the second frequency. Indoor enclosure 301 also transfers an AC power signal to inductive coupler 314, located in indoor coupler unit 302, over power link 322.

In step 402, capacitive coupler 312, located in indoor coupler unit 302, receives the mobile phone call from indoor enclosure 301 over communication link 320 in the electrical signal at the second frequency. Inductive coupler 314, located in indoor coupler unit 302, also receives the AC power signal from indoor enclosure 301 over power link 322. Also in step 402, capacitive coupler 312, located in indoor coupler unit 302, transfers the mobile phone call to capacitive coupler 315, located in outdoor coupler unit 303, over capacitive link 323 through glass 305. Inductive coupler 314, located in indoor coupler unit 302, also transfers the AC power signal to inductive coupler 317, located in outdoor coupler unit 303, over inductive link 325 through glass 305.

In step 403, capacitive coupler 315, located in outdoor coupler unit 303, receives the mobile phone call from capacitive coupler 312, located in indoor coupler unit 302, over capacitive link 323 through glass 305. Inductive coupler 317, located in outdoor coupler unit 303, receives the AC power signal from inductive coupler unit 314, located in indoor coupler unit 302, over inductive link 325 through glass 305. Also in step 403, capacitive coupler 315, located in outdoor coupler unit 303, transfers the mobile phone call to outdoor enclosure 304 over communication link 326 in an electrical signal at the second frequency. Inductive coupler 317, located in outdoor coupler unit 303, transfers the AC power signal to outdoor enclosure 304 over power link 328.

In step 404, outdoor enclosure 304 receives the mobile phone call from capacitive coupler 315, located in outdoor coupler unit 303, over communication link 326 in the electrical signal at the second frequency. Outdoor enclosure 304 also receives the AC power signal from inductive coupler 317, located in outdoor coupler unit 303, over power link 328. Frequency converter 318 converts the electrical signal from the second frequency to the first frequency. Frequency converter 318 and antenna 319 exchange the mobile phone call in the electrical signal at the first frequency. Also in step 404, outdoor enclosure 304 transfers the mobile phone call to a base station in a wireless signal at the first frequency using antenna 319.

In the examples described above, note how the adhesive material allows indoor coupler unit 302 and outdoor coupler unit 303 to be mounted to glass 305 without necessitating placing a hole in either glass 305 or in the building that contains glass 305. Also, in the above examples the indoor and outdoor antennas are spaced far enough apart to avoid any significant interference between them. Note, the frequency conversion that occurs in repeater system 300 reduces interference with other nearby systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A repeater system for providing wireless communications comprising:

a first antenna that receives first user information in a first wireless signal at a first frequency and transfers the first user information in a first electrical signal at the first frequency, a first frequency converter that receives the first user information in the first electrical signal at the first frequency and transfers the first user information in the first electrical signal at a second frequency, and a first coupler that receives the first user information in the first electrical signal at the second frequency and transfers the first user information in a first capacitive signal;

a second coupler that receives the first user information in the first capacitive signal and transfers the first user information in a second electrical signal at the second frequency, a second frequency converter that receives the first user information in the second electrical signal at the second frequency and transfers the first user information in the second electrical signal at the first frequency, and a second antenna that receives the first user information in the second electrical signal at the first frequency and transfers the first user information in a second wireless signal at the first frequency;

the first frequency converter further receives power and transfers the power in a first AC power signal, a third coupler that receives the power in the first AC power signal and transfers the power in an inductive power signal, the second frequency converter further receives the power in a second AC power signal, and a fourth coupler that receives the power in the inductive power signal and transfers the power in the second AC power signal;

the second antenna further receives second user information in a third wireless signal at the first frequency and transmits the second user information in a third electrical signal at the first frequency, the second frequency converter further receives the second user information in the third electrical signal at the first frequency and transfers the second user information in the third electrical signal at the second frequency, and a fifth coupler that receives the second user information in the third electrical signal at the second frequency and transfers the second user information in a second capacitive signal;

a sixth coupler that receives the second user information in the second capacitive signal at the second frequency and transfers the second user information in a fourth electrical signal at the second frequency, the first frequency converter further receives the second user information in the fourth electrical signal at the second frequency and transfers the second user information in the fourth electrical signal at the first frequency, and the first antenna further receives the second user information in the fourth electrical signal at the first frequency and transfers the second user information in a fourth wireless signal at the first frequency.

2. The repeater of claim 1 wherein the first antenna comprises an indoor antenna and the second antenna comprises an outdoor antenna.

3. The repeater system of claim 1 wherein the first frequency is in the RF range and the second frequency is lower than the RF range.

4. The repeater system of claim 1 wherein the second frequency does not interfere with the first frequency.

5. The repeater system of claim 1 wherein the first, third, and sixth couplers are integrated into a first unit having an adhesive material for attachment to glass, and the second, fourth, and fifth couplers are integrated into a second unit having the adhesive material for attachment to glass.

6. The repeater system of claim 5 further comprising a first coaxial cable coupling the first frequency converter and the first unit and a second coaxial cable coupling the second frequency converter and the second unit.

7. The repeater system of claim 1 wherein the first frequency converter and the first antenna are integrated together in a first enclosure and the second frequency converter and the second antenna are integrated together in a second enclosure.

8. The repeater system of claim 1 wherein the first frequency converter amplifies the first electrical signal and the fourth electrical signal and the second frequency converter amplifies the second electrical signal and the third electrical signal.

9. A method of providing wireless communications, the method comprising:

receiving at a first antenna first user information in a first wireless signal at a first frequency and transferring from the first antenna the first user information in a first electrical signal at the first frequency, receiving at a first frequency converter the first user information in the first electrical signal at the first frequency and transferring from the first frequency converter the first user information in the first electrical signal at a second frequency, and receiving at a first coupler the first user information in the first electrical signal at the second frequency and transferring from the first coupler the first user information in a first capacitive signal;

receiving at a second coupler the first user information in the first capacitive signal and transferring from the second coupler the first user information in a second electrical signal at the second frequency, receiving at a second frequency converter the first user information in the second electrical signal at the second frequency and transferring from the second frequency converter the first user information in the second electrical signal at the first frequency, and receiving at a second antenna the first user information in the second electrical signal at the first frequency and transferring from the second antenna the first user information in a second wireless signal at the first frequency;

receiving at the first frequency converter power in a first AC power signal and transferring from the first frequency converter the power in a first inductive power signal, receiving at a third coupler the power in the first AC power signal and transferring from the third coupler the power in an inductive power signal, receiving at a fourth coupler the power in the inductive power signal and transferring from the fourth coupler the power in the second AC power signal, and receiving at the second frequency converter the power in a second inductive power signal and transferring from the second frequency converter the power in a second AC power signal;

receiving at the second antenna second user information in a third wireless signal at the first frequency and transmitting from the second antenna the second user information in a third electrical signal at the first frequency, receiving at the second frequency converter the second user information in the third electrical signal at the first frequency and transferring from the second frequency converter the second user information in the third electrical signal at the second frequency, and receiving at a fifth coupler the second user information in the third electrical signal at the second frequency and transferring from the fifth coupler the second user information in a second capacitive signal;

receiving at a sixth coupler the second user information in the second capacitive signal at the second frequency and transferring from the sixth coupler the second user information in a fourth electrical signal at the second frequency, receiving at the first frequency converter the second user information in the fourth electrical signal at the second frequency and transferring from the first frequency converter the second user information in the fourth electrical signal at the first frequency, and receiving at the first antenna the second user information in the fourth electrical signal at the first frequency and transferring from the first antenna the second user information in a fourth wireless signal at the first frequency.

10. The method of claim 9 wherein the first antenna comprises an indoor antenna and the second antenna comprises an outdoor antenna.

11. The method of claim 9 wherein the first frequency is in the RF range and the second frequency is lower than the RF range.

12. The method of claim 9 wherein the second frequency does not interfere with the first frequency.

13. The method of claim 9 wherein the first, third, and sixth couplers are integrated into a first unit having an adhesive material for attachment to glass, and the second, fourth, and fifth couplers are integrated into a second unit having the adhesive material for attachment to glass.

14. The method of claim 13 further comprising coupling the first frequency converter and the first unit with a first coaxial cable and coupling the second frequency converter and the second unit with a second coaxial cable.

15. The method of claim 9 wherein the first frequency converter and the first antenna are integrated together in a first enclosure and the second frequency converter and the second antenna are integrated together in a second enclosure.

16. The method of claim 9 wherein the first frequency converter amplifies the first electrical signal and the fourth electrical signal and the second frequency converter amplifies the second electrical signal and the third electrical signal.

* * * * *